(12) United States Patent
Munsell et al.

(10) Patent No.: US 11,098,644 B2
(45) Date of Patent: Aug. 24, 2021

(54) GAS TURBINE ENGINE BUFFER SYSTEM

(71) Applicant: United Technologies Corporation, Farmington, CT (US)

(72) Inventors: Peter M. Munsell, Granby, CT (US); Philip S. Stripinis, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 108 days.

(21) Appl. No.: 16/677,721

(22) Filed: Nov. 8, 2019

(65) Prior Publication Data

US 2020/0263604 A1 Aug. 20, 2020

Related U.S. Application Data

(63) Continuation of application No. 14/246,175, filed on Apr. 7, 2014, now Pat. No. 10,487,734, which is a
(Continued)

(51) Int. Cl.
*F02C 6/08* (2006.01)
*F01D 11/06* (2006.01)
(Continued)

(52) U.S. Cl.
CPC .............. *F02C 6/08* (2013.01); *F01D 11/04* (2013.01); *F01D 11/06* (2013.01); *F01D 25/125* (2013.01);
(Continued)

(58) Field of Classification Search
CPC .... F02C 6/08; F02C 9/18; F01D 11/04; F01D 11/06; F01D 25/125; B64D 15/00; B64D 15/02
See application file for complete search history.

(56) References Cited

U.S. PATENT DOCUMENTS 2,258,792 A 4/1941 New
2,749,087 A 6/1956 Bertram et al.
(Continued)

FOREIGN PATENT DOCUMENTS

EP 0791383 8/1997
EP 1142850 10/2001
(Continued)

OTHER PUBLICATIONS

Anderson, R.D. (1985). Advanced Propfan Engine Technology (APET) definition study, single and counter-rotation gearbox/pitch change mechanism design. NASA CR-168115. Jul. 1, 1985. pp. 1-289.
(Continued)

*Primary Examiner* — Craig Kim
(74) *Attorney, Agent, or Firm* — Carlson, Gaskey & Olds, P.C.

(57) ABSTRACT

A gas turbine engine includes a fan, a compressor section, and a turbine section configured to drive the compressor section and the fan. A buffer system is configured to communicate a buffer supply air to a portion of the gas turbine engine. The buffer system includes a first bleed air supply having a first pressure, a second bleed air supply having a second pressure that is greater than the first pressure, and an ejector that selectively augments the first bleed air supply to prepare the buffer supply air for communication to the portion of the gas turbine engine. A method and a buffer system are also disclosed.

20 Claims, 5 Drawing Sheets

Related U.S. Application Data continuation of application No. 13/362,307, filed on Jan. 31, 2012, now abandoned.

(51) Int. Cl.
  *F01D 25/12* (2006.01)
  *F01D 11/04* (2006.01)
  *F02C 9/18* (2006.01)
  *F02C 7/28* (2006.01)
  *F02C 7/06* (2006.01)

(52) U.S. Cl.
  CPC .................. *F02C 9/18* (2013.01); *F02C 7/06* (2013.01); *F02C 7/28* (2013.01); *F05D 2260/601* (2013.01); *Y02T 50/60* (2013.01); *Y10T 29/49323* (2015.01)

(56) References Cited

U.S. PATENT DOCUMENTS

| | | |
|---|---|---|
| 2,936,655 A | 5/1960 | Peterson et al. |
| 2,940,258 A | 6/1960 | Lombard et al. |
| 3,017,230 A | 1/1962 | Hemsworth |
| 3,021,731 A | 2/1962 | Stoeckicht |
| 3,194,487 A | 7/1965 | Tyler et al. |
| 3,287,906 A | 11/1966 | McCormick |
| 3,352,178 A | 11/1967 | Lindgren et al. |
| 3,412,560 A | 11/1968 | Gaubatz |
| 3,441,045 A | 4/1969 | Malone |
| 3,527,054 A | 9/1970 | Meermans |
| 3,664,612 A | 5/1972 | Skidmore et al. |
| 3,729,957 A | 5/1973 | Petrie et al. |
| 3,747,343 A | 7/1973 | Rosen |
| 3,754,484 A | 8/1973 | Roberts |
| 3,765,623 A | 10/1973 | Donelson et al. |
| 3,820,719 A | 6/1974 | Clark |
| 3,843,277 A | 10/1974 | Ehrich |
| 3,892,358 A | 7/1975 | Gisslen |
| 3,925,979 A | 12/1975 | Ziegler |
| 3,932,058 A | 1/1976 | Harner et al. |
| 3,935,558 A | 1/1976 | Miller et al. |
| 3,988,889 A | 11/1976 | Chamay et al. |
| 4,130,872 A | 12/1978 | Harloff |
| 4,220,171 A | 9/1980 | Ruehr |
| 4,240,250 A | 12/1980 | Harris |
| 4,284,174 A | 8/1981 | Salvana et al. |
| 4,289,360 A | 9/1981 | Zirin |
| 4,478,551 A | 10/1984 | Honeycutt, Jr. et al. |
| 4,497,172 A * | 2/1985 | Smith .................... F01D 11/06 184/6.11 |
| 4,513,567 A | 4/1985 | Deveau et al. |
| 4,649,114 A | 3/1987 | Miltenburger et al. |
| 4,696,156 A | 9/1987 | Burr et al. |
| 4,711,084 A | 12/1987 | Brockett |
| 4,722,357 A | 2/1988 | Wynosky |
| 4,845,941 A * | 7/1989 | Paul ........................ F02C 3/067 60/776 |
| 4,979,362 A | 12/1990 | Vershure, Jr. |
| 5,029,440 A | 7/1991 | Graber |
| 5,058,617 A | 10/1991 | Stockman et al. |
| 5,102,379 A | 4/1992 | Pagluica et al. |
| 5,141,400 A | 8/1992 | Murphy et al. |
| 5,317,877 A | 6/1994 | Stuart |
| 5,361,580 A | 11/1994 | Ciokajlo et al. |
| 5,433,674 A | 7/1995 | Sheridan et al. |
| 5,447,411 A | 9/1995 | Curley et al. |
| 5,466,198 A | 11/1995 | McKibbin et al. |
| 5,524,847 A | 6/1996 | Brodell et al. |
| 5,611,661 A | 3/1997 | Jenkinson |
| 5,634,767 A | 6/1997 | Dawson |
| 5,677,060 A | 10/1997 | Terentieva et al. |
| 5,778,659 A | 7/1998 | Duesler et al. |
| 5,857,836 A | 1/1999 | Stickler et al. |
| 5,915,917 A | 6/1999 | Eveker et al. |
| 5,975,841 A | 11/1999 | Lindemuth et al. |
| 5,985,470 A | 11/1999 | Spitsberg et al. |
| 6,223,616 B1 | 5/2001 | Sheridan |
| 6,315,815 B1 | 11/2001 | Spadaccini et al. |
| 6,318,070 B1 | 11/2001 | Rey et al. |
| 6,387,456 B1 | 5/2002 | Eaton, Jr. et al. |
| 6,412,270 B1 | 7/2002 | Mortzheim et al. |
| 6,487,863 B1 * | 12/2002 | Chen ........................ F02C 7/16 60/782 |
| 6,517,341 B1 | 2/2003 | Brun et al. |
| 6,550,253 B2 | 4/2003 | Mortzheim et al. |
| 6,607,165 B1 | 8/2003 | Manteiga et al. |
| 6,615,574 B1 | 9/2003 | Marks |
| 6,701,715 B2 | 3/2004 | Anderson et al. |
| 6,709,492 B1 | 3/2004 | Spadaccini et al. |
| 6,814,541 B2 | 11/2004 | Evans et al. |
| 6,883,303 B1 | 4/2005 | Seda |
| 7,021,042 B2 | 4/2006 | Law |
| 7,059,136 B2 | 6/2006 | Coffinberry |
| 7,162,876 B2 | 1/2007 | Hoff et al. |
| 7,219,490 B2 | 1/2007 | Dev |
| 7,328,580 B2 | 2/2008 | Lee et al. |
| 7,374,403 B2 | 5/2008 | Decker et al. |
| 7,591,754 B2 | 9/2009 | Duong et al. |
| 7,632,064 B2 | 12/2009 | Somanath |
| 7,662,059 B2 | 2/2010 | McCune |
| 7,698,898 B2 | 4/2010 | Eluripati et al. |
| 7,806,651 B2 | 10/2010 | Kennepohl et al. |
| 7,824,305 B2 | 11/2010 | Duong et al. |
| 7,828,682 B2 | 11/2010 | Smook |
| 7,841,165 B2 * | 11/2010 | Orlando .................. F01D 15/12 60/204 |
| 7,926,260 B2 | 4/2011 | Sheridan et al. |
| 7,997,868 B1 | 8/2011 | Liang et al. |
| 8,205,432 B2 | 6/2012 | Sheridan |
| 8,240,153 B2 | 8/2012 | Childers et al. |
| 9,347,374 B2 * | 5/2016 | Suciu ........................ F02C 7/185 |
| 2003/0046938 A1 * | 3/2003 | Mortzheim ................ F02C 7/12 60/782 |
| 2006/0228206 A1 | 10/2006 | Decker et al. |
| 2007/0186535 A1 * | 8/2007 | Powell .................... F02K 3/072 60/226.1 |
| 2007/0243811 A1 | 10/2007 | Alecu et al. |
| 2008/0003096 A1 | 1/2008 | Kohli et al. |
| 2008/0115503 A1 * | 5/2008 | Vasquez ................ F04D 27/023 60/785 |
| 2008/0116009 A1 | 5/2008 | Sheridan et al. |
| 2008/0317588 A1 | 12/2008 | Grabowski et al. |
| 2009/0056343 A1 | 3/2009 | Suciu et al. |
| 2009/0104020 A1 | 4/2009 | Roush et al. |
| 2009/0277155 A1 | 11/2009 | Bulin et al. |
| 2009/0293445 A1 | 12/2009 | Ress, Jr. |
| 2009/0304518 A1 | 12/2009 | Kodama et al. |
| 2009/0314881 A1 | 12/2009 | Suciu et al. |
| 2010/0011779 A1 | 1/2010 | Senior |
| 2010/0040482 A1 | 2/2010 | Whaling et al. |
| 2010/0092116 A1 | 4/2010 | Franconi |
| 2010/0105516 A1 | 4/2010 | Sheridan et al. |
| 2010/0148396 A1 | 6/2010 | Xie et al. |
| 2010/0154434 A1 | 6/2010 | Kubota et al. |
| 2010/0170265 A1 * | 7/2010 | Whaling .................. F02C 3/32 60/785 |
| 2010/0212281 A1 | 8/2010 | Sheridan |
| 2010/0218483 A1 | 9/2010 | Smith |
| 2010/0331139 A1 | 12/2010 | McCune |
| 2011/0159797 A1 | 6/2011 | Beltman et al. |
| 2011/0293423 A1 | 12/2011 | Bunker et al. |
| 2012/0117977 A1 | 5/2012 | Childers et al. |
| 2012/0124964 A1 | 5/2012 | Hasel et al. |
| 2012/0251306 A1 | 10/2012 | Reinhardt et al. |
| 2013/0177406 A1 | 7/2013 | Heaton et al. |
| 2014/0238042 A1 * | 8/2014 | Munsell ................ F01D 25/125 60/785 |

FOREIGN PATENT DOCUMENTS

| | | |
|---|---|---|
| EP | 2119892 | 11/2009 |
| FR | 2698406 | 5/1994 |
| GB | 1516041 | 6/1978 |

(56) References Cited

FOREIGN PATENT DOCUMENTS

| | | |
|---|---|---|
| GB | 2041090 | 9/1980 |
| GB | 2426792 | 12/2006 |
| WO | 2007038674 | 4/2007 |

OTHER PUBLICATIONS

Newton, F.C., Liebeck, R.H., Mitchell, G.H., Mooiweer, M.A., Platte, M.M., Toogood, T.L., and Wright, R.A. (1986). Multiple Application Propfan Study (MAPS): Advanced tactical transport. NASA CR-175003. Mar. 1, 2986. pp. 1-101.
Gliebe, P.R., Ho, P.Y., and Mani, R. (1995). UHB engine fan and broadband noise reduction study. NASA DR-198357. Jun. 1995. pp. 1-48.
Holcombe, V. (2003). Aero-Propulsion Technology (APT) task V low noise ADP engine definition study. NASA CR-2003-212521. Oct. 1, 2003. pp. 1-73.
Sutliff, D. (2005). Rotating rake turbofan duct mode measurement system. NASA TM-2005-213828. Oct. 1, 2005. pp. 1-34.
Adamson, A.P. (1975). Quiet Clean Short-Haul Experimental Engine (QCSEE) design rationale. Society of Automotive Engineers. Air Transportation Meeting. Hartford, CT. May 6-8, 1975. pp. 1-9.
NASA Conference Publication. (1978). CTOL transport technology. NASA-CP-2036-PT-1. Jun. 1, 1978. pp. 1-531.
Kandebo, S.W. (1998). Geared-Turbofan engine design targets cost, complexity. Aviation Week & Space Technology, 148(8). p. 34-5.
Davis, D.G.M. (1973). Variable-pitch fans: Progress in Britain. Flight International. Apr. 19, 1973. pp. 615-617.
Levintan, R.M. (1975). Q-Fan demonstrator engine. Journal of Aircraft. vol. 12( 8). Aug. 1975. pp. 658-663.
Technical Report. (1975). Quiet Clean Short-haul Experimental Engine (QCSEE) UTW fan preliminary design. NASA-CR-134842. Feb. 1, 1975. pp. 1-98.
Aerospace Information Report. (2008). Advanced ducted propulsor in-flight thrust determination. SAE International AIR5450. Aug. 2008. p. 1-392.
Daggett, D.L., Brown, S.T., and Kawai, R.T. (2003). Ultra-efficient engine diameter study. NASA/ CR-2003-212309. May 2003. pp. 1-52.
Honeywell LF507. Jane's Aero-engines, Aero-engines—Turbofan. Feb. 9, 2012.
Honeywell TFE731. Janes Aero-engines, Aero-engines—Turbofan. Jul. 18, 2012.
NASA Conference Publication. Quiet, powered-lift propulsion. Cleveland, Ohio. Nov. 14-15, 1978. pp. 1-420.
"Civil Turbojet/Turbofan Specifications", Jet Engine Specification Database (Apr. 3, 2005).
Kandebo, S.W. (1993). Geared-turbofan engine design targets cost, complexity. Aviation Week & Space Technology, 148(8). Start p. 32.
Hendricks, E.S. and Tong, M.T. (2012). Performance and weight estimates for an advanced open rotor engine. NASA/TM-2012-217710. pp. 1-13.
Guynn, M. D., Berton, J.J., Fisher, K. L., Haller, W.J., Tong, M. T., and Thurman, D.R. (2011). Refined exploration of turbofan design options for an advanced single-aisle transport. NASA/TM-2011-216883. pp. 1-27.
Zalud, T. (1998). Gears put a new spin on turbofan performance. Machine Design, 70(20), p. 104.
Kurzke, J. (2008). Preliminary Design, Aero-engine design: From state of the art turbofans towards innovative architectures. pp. 1-72.
Zamboni, G. and Xu, L. (2009). Fan root aerodynamics for large bypass gas turbine engines: Influence on the engine performance and 3D design. Proceedings of ASME Turbo Expo 2009: Power for Land, Sea and Air. Jun. 8-12, 2009, Orlando, Florida, USA. pp. 1-12.
Han, J., Dutta, S., and Ekkad, S.V. (2000). Gas turbine heat transfer and cooling technology. New York, NY: Taylor & Francis. pp. 1-25, 129-157, and 160-249.

Mattingly, J.D. (1996). Elements of gas turbine propulsion. New York, New York: McGraw-Hill, Inc. pp. 1-18, 30-62, 85-87, 95-104, 121-123, 223-234, 242-245, 278-280, 303-309, 323-326, 462-479, 517-520, 563-565, 673-675, 382-685, 697-699, 703-705, 802-805, 862-864, and 923-925.
Declaration of Reza Abhari, Ph.D. In re U.S. Pat. No. 8,844,265. Executed Jun. 28, 2016. pp. 1-91.
Declaration of John Eaton, Ph.D. In re U.S. Pat. No. 8,869,568. Executed Mar. 28, 2016. pp. 1-87.
Declaration of Reza Abhari. In re U.S. Pat. No. 8,695,920. Executed Nov. 30, pp. 1-67.
Declaration of Reza Abhari. In re U.S. Pat. No. 8,448,895. Executed Nov. 28. pp. 1-81.
Declaration of Reza Abhari. In re U.S. Pat. No. 8,695,920, claims 1-4, 7-14, 17 and 19. Executed Nov. 29. pp. 1-102.
Declaration of Dr. Magdy Attia. In re U.S. Pat. No. 8,313,280. Executed Oct. 21, 2016. pp. 1-88.
Lord, W.K., MacMartin, D.G., and Tillman, T.G. (2000). Flow control opportunities in gas turbine engines. American Institute of Aeronautics and Astronautics. pp. 1-15.
Daly, M. Ed. (2010). Jane's Aero-Engine. Issue Twenty-seven. Mar. 2010. p. 633-636.
Roux, E (2007). Turbofan and turbojet engines database handbook. Editions Elodie Roux. Blagnac: France. pp. 1-595.
Wilfert, G. (2008). Geared fan. Aero-Engine Design: From State of the Art Turbofans Towards Innovative Architectures, von Karman Institute for Fluid Dynamics, Belgium, Mar. 3-7, 2008. pp. 1-26.
Declaration of Dr. Magdy Attia. In re U.S. Pat. No. 8,517,668. Executed Dec. 8, 2016. pp. 1-81.
Cramoisi, G. Ed. (2012). Death in the Potomac: The crash of Air Florida Flight 90. Air Crash Investigations. Accident Report NTSB/AAR-82-8. p. 45-47.
Norton, M. and Karczub, D. (2003). Fundamentals of noise and vibration analysis for engineers. Press Syndicate of the University of Cambridge. New York: New York. p. 524.
U.S. Department of Transportation: Federal Aviation Administration Advisory Circular. Runway overrun prevention. Dated: Nov. 6, 200T p. 1-8 and Appendix 1 p. 1-15, Appendix 2 p. 1-6, Appendix 3 p. 1-3, and Appendix 4 p. 1-5.
U.S. Department of Transportation: Federal Aviation Administration Advisory Circular. Standard operating procedures for flight deck crewmembers. Dated: Feb. 27, 2003.. p. 1-6 and Appendices.
Vasudevan, A.K. and Petrovic, J.J. (1992). A comparative overview of molybedenum disilicide composites. Materials Science and Engineering, A155, 1992. pp. 1-17.
Clarke, D.R. and Levi, C.G. (2003). Materials design for the next generation thermal barrier coatings. Annual. Rev. Mater. Res. vol. 33. 2003. pp. 383-417.
Lee, K.N. (2000). Current status of environmental barrier coatings for Si-Based ceramics. Surface and Coatings Technology 133-134, 2000. pp. 1-7.
Bornstein, N. (1993). Oxidation of advanced intermetallic compounds. Journal de Physique IV, 1993, 03 (C9), pp. C9-36-C9-373.
Krenkel, W., Naslain, R., and Schneider, H. Eds. (2001). High temperature ceramic matrix composites pp. 224-229. Weinheim, DE: Wiley-VCH Verlag GmbH.
Gibala, R., Ghosh, A.K., Van Aken, D.C., Srolovitz, D.J., Basu, A., Chang, H., . . . Yang, W. (1992). Mechanical behavior and interface design of MoSi2-based alloys and composites. Materials Science and Engineering, A155,1992. pp. 147-158.
Shah, D.M. (1992). MoSi2 and other silicides as high temperature structural materials. Superalloys 1992. The Minerals, Metals, & Materials Society. pp. 409-422.
Zhao, J.C. and Westbrook, J.H. (2003). Ultrahigh-temperature materials for jet engines. MRS Bulletin. vol. 28 (9). Sep. 2003. pp. 622-630.
Tsirlin, M., Pronin, Y.E., Florina, E.K., Mukhametov, S. Kh., Khatsernov, M.A., Yun, H.M., . . . Kroke, E. (2001). Experimental investigation of multifunctional interphase coatings on SiC fibers for non-oxide high temperature resistant CMCs. High Temperature Ceramic Matrix Composites. 4th Int'l Conf. on High Temp. Ceramic Matrix Composites. Oct. 1-3, 2001. pp. 149-156.

(56) References Cited

OTHER PUBLICATIONS

Jacobson, N.S. (1993). Corrosion of silicon-based ceramics in combustion environments. J. Am. Ceram. Soc. 76 (1). pp. 3-28.

Jorgensen, P.J., Wadsworth, M.E., and Cutler, I.B. (1961). Effects of water vapor on oxidation of silicon carbide. J. Am. Ceram. Soc. 44(6). pp. 248-261.

Xu, Y., Cheng, L., Zhang, L., Ying, H., and Zhou, W. (1999). Oxidation behavior and mechanical properties of C/SiC composites with Si-MoSi2 oxidation protection coating. J. of Mat. Sci. vol. 34. 1999. pp. 6009-6014.

Sundaram, S.K., Hsu, J-Y., Speyer, R.F. (1995). Molten glass corrosion resistance of immersed combustion-heating tube materials in e-glass. J. Am. Ceram. Soc. 78(7). pp. 1940-1946.

Jeng, Y.-L., Lavernia, E.J. (1994). Processing of molybdenum disilicide. J. of Mat. Sci. vol. 29. 1994. pp. 2557-2571.

Suzuki, Y., Morgan, P.E.D., and Niihara, K. (1998). Improvement in mechanical properties of powder-processed MoSi2 by the addition of Sc2O3 and Y2O3. J. Am. Ceram. Soci. 81(12). pp. 3141-3149.

Webster, J.D., Westwood, M.E., Hayes, F.H., Day, R.J., Taylor, R., Duran, A., . . . Vogel, W.D. (1998). Oxidation protection coatings for C/SiC based on yttrium silicate. Journal of European Ceramic Society vol. 18. 1998. pp. 2345-2350.

Petrovic, J.J., Castro, R.G., Vaidya, R.U., Peters, M.I., Mendoza, D., Hoover, R.C., and Gallegos, D. E. (2001). Molybdenum disilicide materials for glass melting sensor sheaths. Ceramic Engineering and Science Proceedings. vol. 22(3). 2001. pp. 59-64.

Kahn, H., Tayebi, N., Ballarini, R., Mullen, R.L., Heuer, A.H. (2000). Fracture toughness of polysilicon MEMS devices. Sensors and Actuators vol. 82. 2000. pp. 274-280.

Muhlstein, C.L., Stach, E.A., and Ritchie, R.O. (2002). A reaction-layer mechanism for the delayed failure of micron-scale polycrystalline silicon structural films subjected to high-cycle fatigue loading. Acta Materialia vol. 50. 2002. pp. 3579-3595.

Sundaram, S.K., Hsu, J-Y., Speyer, R.F. (1994). Molten glass corrosion resistance of immersed combustion-heating tube materials in soda-lime-silicate glass. J. Am. Ceram. Soc. 77(6). pp. 1613-1623.

Leckie, F.A. and Dal Bello, D.J. (2009). Strength and stiffness of engineering systems. Mechanical Engineering Series. Springer. pp. 1-3.

El-Sayad, A.F. (2008). Aircraft propulsion and gas turbine engines. Boca Raton, FL: CRC Press. pp. 215-219 and 855-860.

Bunker, R.S. (2005). A review of shaped hole turbine film-cooling technology. Journal of Heat Transfer vol. 127. Apr. 2005. pp. 441-453.

Winn, A. (Ed). (1990). Wide Chord Fan Club. Flight International, 4217(137). May 23-29, 1990. pp. 34-38.

Parker, R.G. and Lin, J. (2001). Modeling, modal properties, and mesh stiffness variation instabilities of planetary gears. Prepared for NASA. NASA/CR-2001-210939. May 2001. pp. 1-111.

Mancuso, J.R. and Corcoran, J.P. (2003). What are the differences in high performance flexible couplings for turbomachinery? Proceedings of the Thirty-Second Turbomachinery Symposium. 2003. pp. 189-207.

Dudley, D.W., Ed. (1954). Handbook of practical gear design. Lancaster, PA: Technomic Publishing Company, Inc. pp. 3.96-3.102 and 8.12-8.18.

Dudley, D.W., Ed. (1962). Gear handbook. New York, NY: McGraw-Hill. pp. 3.14-3.18 and 12.7-12.21.

Dudley, D.W., Ed. (1994). Practical gear design. New York, NY: McGraw-Hill. pp. 119-124.

Product Brochure. Garrett TFE731. Allied Signal. Copyright 1987. pp. 1-24.

Honeywell Learjet 31 and 35/36 TFE731-2 to 2C Engine Upgrade Program. Sep. 2005. pp. 1-4.

Honeywell Sabreliner 65 TFE731-3 to -3D Engine Upgrade Program. Oct. 2005. pp. 1-4.

U.S. Department of Transportation: Federal Aviation Administration Type Certificate Data Sheet No. E6WE. Dated: May 9, 2000. p. 1-9.

Kurzke, J. (2012). GasTurb 12: Design and off-design performance of gas turbines. Retrieved from: https://www.scribd.com/document/153900429/GasTurb-12.

Ahmad, F. and Mizramoghadam, A.V. (1999). Single v. two stage high pressure turbine design of modern aero engines. ASME. Presented at the International Gas Turbine & Aeroengine Congress & Exhibition. Indianapolis, Indiana. Jun. 7-10, 1999. pp. 1-9.

Riegler, C., and Bichlmaier, C. (2007). The geared turbofan technology—Opportunities, challenges and readiness status. Porceedings CEAS. Sep. 10-13, 2007 Berlin, Germany. pp. 1-12.

About GasTurb. Retrieved Jun. 26, 2018 from: http://gasturb.de/about-gasturb.html.

Kurzke, J. (2001). GasTurb 9: A program to calculate design and off-design performance of gas turbines. Retrieved from: https://www.scribd.com/document/92384867/GasTurb9Manual.

Tummers, B. (2006). DataThief III. Retreived from: https://datathief.org/DatathiefManual.pdf pp. 1-52.

Manual. Student's Guide to Learning SolidWorks Software. Dassault Systemes—SolidWorks Corporation. pp. 1-156.

Macisaac, B. and Langston, R. (2011). Gas turbine propulsion systems. Chichester, West Sussex: John Wiley & Sons, Ltd. pp. 260-265.

Datasheet. CFM56-5B for the Airbus A320ceo family and CFM56-7B for the Boeing 737 family. https://www.cfmaeroengines.com/.

Turner, M. G., Norris, A., and Veres, J.P. (2004). High-fidelity three-dimensional simulation of the GE90. NASA/TM-2004-212981. pp. 1-18.

Defeo, A. and Kulina, M. (1977). Quiet clean short-haul experimental engine (QCSEE) main reduction gears detailed design final report. Prepared for NASA. NASA-CR-134872. Jul. 1977. pp. 1-221.

Amezketa, M., Iriarte, X., Ros, J., and Pintor, J. (2009). Dynamic model of a helical gear pair with backlash and angle0varying mesh stiffness. Multibody Dynamics 2009, ECCOMAS Thematic Conference. 2009. pp. 1-36.

Singh, A. (2005). Application of a system level model to study the planetary load sharing behavior. Jounal of Mechanical Design. vol. 12T May 2005. pp. 469-476.

Smith-Boyd, L. and Pike, J. (1986). Expansion of epicyclic gear dynamic analysis program. Prepared for NASA. NASA CR-179563. Aug. 1986. pp. 1-98.

Wikipedia. Torsion spring. Retreived Jun. 29, 2018 from: https://en.wikipedia.org/wiki/Torsion_spring.

AGMA Standard (2006). Design manual for enclosed epicyclic gear drives. Alexandria, VA: American Gear Manufacturers Association. pp. 1-104.

AGMA Standard (1997). Design and selection of components for enclosed gear drives. lexandria, VA: American Gear Manufacturers Association. pp. 1-48.

Daly, M. Ed. (2007). Jane's Aero-Engine. Issue Twenty-three. Mar. 2008. p. 707-12.

AGMA Standard (1999). Flexible couplings—Mass elastic properties and other characteristics. Alexandria, VA: American Gear Manufacturers Association. pp. 1-46.

Wikipedia. Stiffness. Retrieved Jun. 28, 2018 from: https://en.wikipedia.org/wiki/Stiffness.

Damerau, J. (2014) What is the mesh stiffness of gears? Screen shot of query submitted by Vahid Dabbagh, answered by Dr. Jochan Damerau, Research General Manager at Bosch Corp., Japan. Retrieved from: https://www.researchgate.net/post/What_is_the_mesh_stiffness_of gears.

Hill, P.G., Peterson, C.R. (1965). Mechanics and thermodynamics of propulsion. Addison-Wesley Publishing Company, Inc. pp. 307-308.

Hill, P.G., Peterson, C.R. (1992). Mechanics and thermodynamics of propulsion, 2nd Edition. Addison-Wesley Publishing Company, Inc. pp. 400-406.

Kasuba, R. and August, R. (1984). Gear mesh stiffness and load sharing in planetary gearing. American Society of Mechanical Engineers, Design Engineering Technical Conference, Cambridge, MA Oct. 7-10, 1984. pp. 1-6.

Ciepluch, C. (1977). Quiet clean short-haul experimental engine (QCSEE) under-the-wing (UTW) final design report. Prepared for

(56) References Cited

OTHER PUBLICATIONS

NASA. NASA-CP-13484T Retreived from: https://ntrs.nasa.gov/archive/nasa/casi.ntrs.nasa.gov/19800075257.pdf.
Gray, D.E. and Gardner, W.B. (1983). Energy efficient engine program technology benefit/cost study—vol. 2. NASA CR-174766. Oct. 1983. pp. 1-118.
Groweneweg, J.F. (1994). Fan noise research at NASA. NASA-TM-106512. Prepared for the 1994 National Conference on Noise Control Engineering. Fort Lauderdale, FL. May 1-4, 1994. pp. 1-10.
Groweneweg, J.F. (1994). Fan noise research at NASA. Noise-CON 94. Fort Lauderdale, FL. May 1-4, 1994. pp. 1-10.
Heidelberg, L.J., and Hall, D.G. (1992). Acoustic mode measurements in the inlet of a model turbofan using a continuously rotating rake. NASA-TM-105989. Prepared for the 31st Aerospace Sciences Meeting. Reno, NV. Jan. 11-14,1993. pp. 1-30.
Heidelberg, L.J., and Hall, D.G. (1992). Acoustic mode measurements in the inlet of a model turbofan using a continuously rotating rake. AIAA-93-0598. 31st Aerospace Sciences Meeting. Reno, NV. Jan. 11-14, 1993. pp. 1-30.
Howe, D.C., and Wynosky, T.A. (1985). Energy efficient engine program advanced turbofan nacelle definition study. NASA-CR-174942. May 1985. pp. 1-60.
Howe, D.C., and Wynosky, T.A. (1985). Energy efficient engine program advanced turbofan nacelle definition study. NASA-CR-174942. May 1985. University of Washington dated Dec. 13, 1990. pp. 1-14.
Wie, Y.S., Collier, F.S., Wagner, R.D., Viken, J.K., and Pfenniger, W. (1992). Design of a hybrid laminar flow control engine nacelle. AIAA-92/0400. 30th Aerospace Sciences Meeting & Exhibit. Jan. 6-9, 1992. pp. 1-14.
Mattingly, J.D. (1996). Elements of gas turbine propulsion. New York, New York: McGraw-Hill, Inc. pp. 1-18, 60-62, 223-234, 462-479, 517-520, 757-767, and 862-864.
Johnston, R.P., Hirschkron, R., Koch, C.C., Neitzel, R.E., and Vinson, P.W. (1978). Energy efficient engine: Preliminary design and integration study—final report. NASA CR-1354-44. Sep. 1978. pp. 1-401.
Johnston, R.P. and Hemsworth, M.C. (1978). Energy efficient engine preliminary design and integration studies. Jun. 1, 1978. pp. 1-28.
Awker, R.W. (1986). Evaluation of propfan propulsion applied to general aviation. NASA CR-175020. Mar. 1, 1986. pp. 1-140.
Howe, D.C. and Wynosky, T.A. (1985). Energy efficient engine program advanced turbofan nacelle definition study. NASA CR-174942. May 1, 1985. pp. 174.
Singh, B. (1986). Small engine component technology (SECT) study. NASA CR-175079. Mar. 1, 1986. pp. 1-102.
Liebeck, R.H., Andrastek, D.A., Chau, J., Girvin, R., Lyon, R., Rawdon, B.K., Scott, P.W. et al. (1995). Advanced subsonic airplane design & economics studies. NASA CR-195443. Apr. 1995. pp. 1-187.
Davies, D. and Miller, D.C. (1971). A variable pitch fan for an ultra quiet demonstrator engine. 1976 Spring Convention: Seeds for Success in Civil Aircraft Design in the Next Two Decades. pp. 1-18.
Middleton, P. (1971). 614: VFW's jet feederliner. Flight International, Nov. 4, 1971 p. 725, 729-732.
Schaefer, J.W., Sagerser, D.R., and Stakolich, E.G. (1977). Dynamics of high-bypass-engine thrust reversal using a variable-pitch fan. Technical Report prepare for NASA. NASA-TM-X-3524. May 1, 1977. pp. 1-33.
Savelle, S.A. and Garrard, G.D. (1996). Application of transient and dynamic simulations to the U.S. Army T55-L-712 helicopter engine. The American Society of Mechanical Engineers. Presented Jun. 10-13, 1996. pp. 1-8.
Drago, R.J. and Margasahayam, R.N. (1987). Stress analysis of planet gears with integral bearings; 3D finite-element model development and test validation. 1987 MSC NASTRAN World Users Conference. Los Angeles, CA. Mar. 1987. pp. 1-14.
Baker, R.W. (2000). Membrane technology and applications. New York, NY: McGraw-Hill. pp. 87-153.

Cheryan, M. (1998). Ultrafiltration and microfiltration handbook. Lancaster, PA: Tecnomic Publishing Company, Inc. pp. 171-236.
Seader, J.D. and Henley, E.J. (1998). Separation process principles. New York, NY: John Wiley & Sons, Inc. pp. 722-726 and 764-771.
Spadaccini, L.J., and Huang, H. (2002). On-line fuel deoxygenation for coke suppression. ASME, Jun. 2002. pp. 1-7.
Darrah, S. (1987). Jet fuel deoxygenation. Interim Report for Period Mar. 1987-Jul. 1988. pp. 1-22.
Bucknell, R.L. (1973). Influence of fuels and lubricants on turbine engine design and performance, fuel and lubricant analyses. Final Technical Report, Mar. 1971-Mar. 1973. pp. 1-252.
Hazlett, R.N. (1991). Thermal oxidation stability of aviation turbine fuels. Philadelphia, PA: ASTM. pp. 1-163.
Taylor, W.F. (1974). Deposit formation from deoxygenated hydrocarbons. I. General features. Ind. Eng. Chem., Prod. Res. Develop., vol. 13(2). 1974. pp. 133-138.
Taylor, W.F. (1974). Deposit formation from deoxygenated hydrocarbons. II. Effect of trace sulfur compounds. Ind. Eng. Chem., Prod. Res. Dev., vol. 15(1). 1974. pp. 64-68.
Taylor, W.F. and Frankenfeld, J.W. (1978). Deposit fromation from deoxygenated hydrocarbons. 3. Effects of trace nitrogen and oxygen compounds. Ind. Eng. Chem., Prod. Res Dev., vol. 17(1). 1978. pp. 86-90.
Frankenfeld, J.W. and Taylor, W.F. (1980). Deposit fromation from deoxygenated hydrocarbons. 4. Studies in pure compound systems. Ind. Eng. Chem., Prod. Res Dev., vol. 19(1). 1978. pp. 65-70.
Hemighaus, G., Boval, T., Bacha, J., Barnes, F., Franklin, M., Gibbs, L., . . . Morris, J. (2007). Aviation fuels: Technical review. Chevron Products Company. pp. 1-94. Retrieved from: https://www.cgabusinessdesk.com/document/aviation_tech_review.pdf.
Spadaccini, L.J., Sobel, D.R., and Huang, H. (2001). Deposit formation and mitigation in aircraft fuels. Journal of Eng. For Gas Turbine and Power, vol. 123. Oct. 2001. pp. 741-746.
Edwards, T. and Zabarnick, S. (1993). Supercritical fuel deposition mechanisms. Ind. Eng. Chem. Res. vol. 32. 1993. pp. 3117-3122.
Huang, H., Sobel, D.R., and Spadaccini, L.J. (2002). Endothermic heat-sink of hydrocarbon fuels for scramjet cooling. AIAA/ASME/SAE/ASEE, Jul. 2002. pp. 1-7.
Bessarabov, D.G., Jacobs, E.P., Sanderson, R.D., and Beckman, I.N. (1996). Use of nonporous polymeric flat-sheet gas-separation membranes in a membrane-liquid contactor: experimental studies. Journal of Membrane Sciences, vol. 113. 1996. pp. 275-284.
Matsumoto, T., Toshiro, U., Kishida, A., Tsutomu, F., Maruyama, I., and Akashi, M. (1996). Novel functional polymers: Poly (dimethylsiloxane)-polyamide multiblock copolymer. VII. Oxygen permeability of aramid-silicone membranes in a gas-membrane-liquid system. Journal of Applied Polymer Science, vol. 64(6). May 9, 1997. pp. 1153-1159.
Technical Data. Teflon. WS Hampshire Inc. Retrieved from: http://catalog.wshampshire.com/Asset/psg_teflon_ptfe.pdf.
Anderson, N.E., Loewenthal, S.H., and Black, J.D. (1984). An analytical method to predict efficiency of aircraft gearboxes. NASA Technical Memorandum prepared for the Twentieth Joint Propulsion Conference. Cincinnati, OH. Jun. 11-13, 1984. pp. 1-25.
Edkins, D.P., Hirschkron, R., and Lee, R. (1972). TF34 turbofan quiet engine study. Final Report prepared for NASA. NASA-CR-120914. Jan. 1, 1972. pp. 1-99.
Waters, M.H. and Schairer, E.T. (1977). Analysis of turbofan propulsion system weight and dimensions. NASA Technical Memorandum. Jan. 1977. pp. 1-65.
Meyer, A.G. (1988). Transmission development of TEXTRON Lycoming's geared fan engine. Technical Paper. Oct. 1988. pp. 1-12.
Dudley, D.W., Ed. (1962). Gear handbook. New York, NY: McGraw-Hill. pp. 14-17 (TOC, Preface, and Index).
Hughes, C. (2002). Aerodynamic performance of scale-model turbofan outlet guide vanes designed for low noise. Prepared for the 40th Aerospace Sciences Meeting and Exhibit. Reno, NV. NASA/TM-2001-211352. Jan. 14-17, 2002. pp. 1-38.
Kaplan, B., Nicke, E., Voss, C. (2006), Design of a highly efficient low-noise fan for ultra-high bypass engines. Proceedings of GT2006 for ASME Turbo Expo 2006: Power for Land, Sea and Air. Barcelona, SP May 8-11, 2006. pp. 1-10.

(56) References Cited

OTHER PUBLICATIONS

Gates, D. Bombardier flies at higher market. Seattle Times. Jul. 13, 2008. pp. C6.

Decker, S. and Clough, R. (2016). GE wins shot at voiding pratt patent in jet-engine clash. Bloomberg Technology. Retrieved from: https://www.bloomberg.com/news/articles/2016-06-30/ge-wins-shot-to-invalidate-pratt-airplane-engine-patent-in-u-s.

Trembley, Jr., H.F. (1977). Determination of effects of ambient conditions on aircraft engine emissions. ALF 502 combustor rig testing and engine verification test. Prepared for Environmental Protection Agency. Sep. 1977. pp. 1-256.

Lewicki, D.G., Black, J.D., Savage, M., and Coy, J.J. (1985). Fatigue life analysis of a turboprop reduction gearbox. NASA Technical Memorandum. Prepared for the Design Technical Conference (ASME). Sep. 11-13, 1985. pp. 1-26.

McCune, M.E. (1993). Initial test results of 40,000 horsepower fan drive gear system for advanced ducted propulsion systems. AIAA 29th Joint Conference and Exhibit. Jun. 28-30, 1993. pp. 1-10.

Wright, G.H. and Russell, J.G. (1990). The M.45SD-02 variable pitch geared fan engine demonstrator test and evaluation experience. Aeronautical Journal., vol. 84(836). Sep. 1980. pp. 268-277.

Drago, R.J. (1974). Heavy-lift helicopter brings up drive ideas. Power Transmission Design. Mar. 1987. pp. 1-15.

Krantz, T.L. (1990). Experimental and analytical evaluation of efficiency of helicopter planetary stage. NASA Technical Paper. Nov. 1990. pp. 1-19.

Heingartner, P., MBA, D., Brown, D. (2003). Determining power losses in the helical gear mesh; Case Study. ASME 2003 Design Engineering Technical Conferences. Chicago, IL. Sep. 2-6, 2003. pp. 1-7.

Thulin, R.D., Howe, D.C., and Singer, I.D. (1982). Energy efficient engine: High pressure turbine detailed design report. Prepared for NASA NASA CR-165608. pp. 1-178.

Reshotko, M., Karchmer, A., Penko, P.F. (1977). Core noise measurements on a YF-102 turbofan engine. NASA TM X-73587. Prepared for Aerospace Sciences Meeting sponsored by the American Institute of Aeronautics and Astronautics. Jan. 24-26, 2977.

Gray, D.E. (1978). Energy efficient engine preliminary design and integration studies. Prepared for NASA. NASA CR-135396. Nov. 1978. pp. 1-366.

Reynolds, C.N. (1985). Advanced prop-fan engine technology (APET) single- and counter-rotation gearbox/pitch change mechanism. Prepared for NASA NASA CR-168114 (vol. I). Jul. 1985. pp. 1-295.

McArdle, J.G. and Moore, A.S. (1979). Static test-stand performance of the YF-102 turobfan engine with several exhaust configurations for the Quiet Short-Haul Research Aircraft (QSRA). Prepared for NASA. NASA-TP-1556. Nov. 1979. pp. 1-68.

Mattingly, J.D. (1996). Elements of gas turbine propulsion. New York, New York: McGraw-Hill, Inc. pp. 1-18, 30-62, 85-87, 95-104, 121-123, 223-234, 242-245, 278-285, 303-309, 323-326, 462-479, 517-520, 563-565, 630-632, 368-670, 673-675, 682-685, 697-705, 726-727, 731-732, 802-805, 828-830 and appendices.

Falchetti, F., Quiniou, H., and Verdier, L. (1994). Aerodynamic design and 3D Navier-Stokes analysis of a high specific flow fan. ASME. Presented at the International Gas Turbine and Aeroengine Congress and Exposition. The Hague, Netherlands. Jun. 13-16, 1994. pp. 1-10.

Datasheet. CF6-80C2 high-bypass turbofan engines. Retreived from https://geaviation.com/sites/default/files/ datasheet-CF6-80C2.pdf.

Salemme, C.T. and Murphy, G.C. (1979). Metal spar/superhybrid shell composite fan blades. Prepared for NASA. VASA-CR-159594. Aug. 1979. pp. 1-127.

"Press release. The GE90 engine. Retrieved from: https://www.geaviation.com/commercial/engines/ge90-engine; https://www.geaviation.com/press-release/ge90-engine-family/ge90-115b-fan-completing-blade-testing-schedule-first-engine-test; and https://www.geaviation.com/press-release/ge90-engine-family/ge'scomposite-fan-blade-revolution-turns-20-years-old".

Datasheet. Genx™ high bypass turbofan engines. Retrieved from: https://www.geaviation.com/sites/default/files/datasheet-genx.pdf.

International Search Report and Written Opinion for International Application No. PCT/US2013/021513 completed Feb. 4. 2013.

Supplementary European Search Report for European Patent Application No. 13744090.5 completed May 24, 2016.

McMillian, A. (2008) Material development for fan blade containment casing. Abstract. p. 1. Conference on Engineering and Physics: Synergy for Success 2006. Journal of Physics: Conference Series vol. 105. London, UK. Oct. 5, 2006.

Kurzke, J. (2009). Fundamental differences between conventional and geared turbofans. Proceedings of ASME Turbo Expo: Power for Land, Sea, and Air. 2009, Orlando, Florida. pp. 145-153.

Agarwal, B.D and Broutman, L.J. (1990). Analysis and performance of fiber composites, 2nd Edition. John Wiley & Sons, Inc. New York: New York. pp. 1-30, 50-51, 56-58, 60-61, 64-71, 87-89, 324-329, 436-437.

Carney, K., Pereira, M. Revilock, and Matheny, P. (2003). Jet engine fan blade containment using two alternate geometries. 4th European LS-DYNA Users Conference. pp. 1-10.

Brines, G.L. (1990). The turbofan of tomorrow. Mechanical Engineering: The Journal of the American Society of Mechanical Engineers,108(8), 65-67.

Faghri, A. (1995). Heat pipe and science technology. Washington, D.C.: Taylor & Francis. pp. 1-60.

Hess, C. (1998). Pratt & Whitney develops geared turbofan. Flug Revue 43(7). Oct. 1998.

Grady, J.E., Weir, D.S., Lamoureux, M.C., and Martinez, M.M. (2007). Engine noise research in NASA's quiet aircraft technology project. Papers from the International Symposium on Air Breathing Engines (ISABE). 2007.

Griffiths, B. (2005). Composite fan blade containment case. Modern Machine Shop. Retrieved from: http://www.mmsonline.com/articles/composite-fan-blade-containment-case pp. 1-4.

Hall, C.A. and Crichton, D. (2007). Engine design studies for a silent aircraft. Journal of Turbomachinery, 129, 479-487.

Haque, A. and Shamsuzzoha, M., Hussain, F., and Dean, D. (2003). S20-glass/epoxy polymer nanocomposites: Manufacturing, structures, thermal and mechanical properties. Journal of Composite Materials, 37(20), 1821-1837.

Brennan, P.J. and Kroliczek, E.J. (1979). Heat pipe design handbook. Prepared for National Aeronautics and Space Administration by B & K Engineering, Inc. Jun. 1979. pp. 1-348.

Horikoshi, S. and Serpone, N. (2013). Introduction to nanoparticles. Microwaves in nanoparticle synthesis. Wiley-VCH Verlag GmbH & Co. KGaA. pp. 1-24.

Kerrebrock, J.L. (1977). Aircraft engines and gas turbines. Cambridge, MA: The MIT Press. p. 11.

Xie, M. (2008). Intelligent engine systems: Smart case system. NASA/CR-2008-215233. pp. 1-31.

Knip, Jr., G. (1987). Analysis of an advanced technology subsonic turbofan incorporating revolutionary materials. NASA Technical Memorandum. May 1987. pp. 1-23.

Willis, W.S. (1979). Quiet clean short-haul experimental engine (QCSEE) final report. NASA/CR-159473 pp. 1-289.

Kojima, Y., Usuki, A. Kawasumi, M., Okada, A., Fukushim, Y., Kurauchi, T., and Kamigaito, O. (1992). Mechanical properties of nylon 6-clay hybrid. Journal of Materials Research, 8(5), 1185-1189.

Kollar, L.P. and Springer, G.S. (2003). Mechanics of composite structures. Cambridge, UK: Cambridge University Press. p. 465.

Ramsden, J.M. (Ed). (1978). The new European airliner. Flight International, 113(3590). Jan. 7, 1978. pp. 39-43.

Langston, L. and Faghri, A. Heat pipe turbine vane cooling. Prepared for Advanced Turbine Systems Annual Program Review. Morgantown, West Virginia. Oct. 17-19, 1995. pp. 3-9.

Oates, G.C. (Ed). (1989). Aircraft propulsion systems and technology and design. Washington, D.C.: American Institute of Aeronautics, Inc. pp. 341-344.

Lau K., Gu, C., and Hui, D. (2005). A critical review on nanotube and nanotube/nanoclay related polymer composite materials. Composites: Part B 37(2006) 425-436.

Shorter Oxford English dictionary, 6th Edition. (2007). vol. 2, N-Z. p. 1888.

(56) References Cited

OTHER PUBLICATIONS

Lynwander, P. (1983). Gear drive systems: Design and application. New York, New York: Marcel Dekker, Inc. pp. 145, 355-358.

Sweetman, B. and Sutton, O. (1998). Pratt & Whitney's surprise leap. Interavia Business & Technology, 53.621, p. 25.

Mattingly, J.D. (1996). Elements of gas turbine propulsion. New York, New York: McGraw-Hill, Inc. pp. 8-15.

Pyrograf-III Carbon Nanofiber. Product guide. Retrieved Dec. 1, 2015 from: http://pyrografproducts.com/Merchant5/merchant.mvc?Screen=cp_nanofiber.

Nanocor Technical Data for Epoxy Nanocomposites using Nanomer 130E Nanoclay. Nnacor, Inc. Oct. 2004.

Ratna, D. (2009). Handbook of thermoset resins. Shawbury, UK: iSmithers. pp. 187-216.

Wendus, B.E., Stark, D.F., Holler, R.P., and Funkhouser, M.E. (2003). Follow-on technology requirement study for advanced subsonic transport. NASA/CR-2003-212467 pp. 1-37.

Silverstein, C.C., Gottschlich, J.M., and Meininger, M. The feasibility of heat pipe turbine vane cooling. Presented at the International Gas Turbine and Aeroengine Congress and Exposition, The Hague, Netherlands. Jun. 13-16, 1994.pp. 1-7.

Merriam-Webster's collegiate dictionary, 11th Ed. (2009). p. 824.

Merriam-Webster's collegiate dictionary, 10th Ed. (2001). p. 1125-1126.

Whitaker, R. (1982). ALf 502: plugging the turbofan gap. Flight International, p. 237-241, Jan. 30, 1982.

Hughes, C. (2010). Geared turbofan technology. NASA Environmentally Responsible Aviation Project. Green Aviation Summit. NASA Ames Research Center. Sep. 8-9, 2010. pp. 1-8.

Gliebe, P.R. and Janardan, B.A. (2003). Ultra-high bypass engine aeroacoustic study. NASA/CR-2003-21252. GE Aircraft Engines, Cincinnati, Ohio. Oct. 2003. pp. 1-103.

Moxon, J. How to save fuel in tomorrow's engines. Flight International. Jul. 30, 1983. 3873(124). pp. 272-273.

File History for U.S. Appl. No. 12/131,876.

Cusick, M. (1981). Avco Lycoming's ALF 502 high bypass fan engine. Society of Automotive Engineers, inc. Business Aircraft Meeting & Exposition. Wichita, Kansas. Apr. 7-10, 1981. pp. 1-9.

Fledderjohn, K.R. (1983). The TFE731-5: Evolution of a decade of business jet service. SAE Technical Paper Series. Business Aircraft Meeting & Exposition. Wichita, Kansas. Apr. 12-15, 1983. pp. 1-12.

Dickey, T.A. and Dobak, E.R. (1972). The evolution and development status of ALF 502 turbofan engine. National Aerospace Engineering and Manufacturing Meeting. San Diego, California. Oct. 2-5, 1972. pp. 1-12.

Gunston, B. (Ed.) (2000). Jane's aero-engines, Issue seven. Coulsdon, Surrey, UK: Jane's Information Group Limited. pp. 510-512.

Ivchenko-Progress D-436. Jane's Aero-engines, Aero-engines—Turbofan. Feb. 8, 2012.

Ivchenko-Progress AI-727M. Jane's Aero-engines, Aero-engines—Turbofan. Nov. 27, 2011.

Ivchenko-Progress D-727. Jane's Aero-engines, Aero-engines—Turbofan. Feb. 7, 2007.

Turbomeca Aubisque. Jane's Aero-engines, Aero-engines—Turbofan. Nov. 2, 2009.

Aviadvigatel D-110. Jane's Aero-engines, Aero-engines—Turbofan. Jun. 1, 2010.

Rolls-Royce M45H. Jane's Aero-engines, Aero-engines—Turbofan. Feb. 24, 2010.

Honeywell LF502. Jane's Aero-engines, Aero-engines—Turbofan. Feb. 9, 2012.

\* cited by examiner

GAS TURBINE ENGINE BUFFER SYSTEM

CROSS-REFERENCE TO RELATED APPLICATION

This application is a continuation of U.S. application Ser. No. 14/246,175, filed Apr. 7, 2014, which is a continuation of U.S. application Ser. No. 13/362,307, filed Jan. 31, 2012.

BACKGROUND

This disclosure relates to a gas turbine engine, and more particularly to a buffer system that can communicate a buffer supply air to one or more portions of the gas turbine engine.

Gas turbine engines typically include at least a compressor section, a combustor section and a turbine section. During operation, air is pressurized in the compressor section and is mixed with fuel and burned in the combustor section to generate hot combustion gases. The hot combustion gases are communicated through the turbine section which extracts energy from the hot combustion gases to power the compressor section and other gas turbine engine modes.

Gas turbine engines typically include shafts that support a plurality of airfoil supporting rotors of the compressor section and the turbine section. Generally, these shafts are supported by bearing structures that define bearing compartments. The bearing compartments house one or more bearings and contain lubricant that is used to lubricate the bearings. The lubricant is contained within the bearing compartment by one or more seals. A predetermined differential pressure must be maintained across the seals so the lubricant cannot leak past the seals.

SUMMARY

A gas turbine engine according to an example of the present application includes a fan, a compressor section, a turbine section configured to drive the compressor section and the fan, and a buffer system configured to communicate a buffer supply air to a portion of the gas turbine engine. The buffer system includes a first bleed air supply having a first pressure, a second bleed air supply having a second pressure that is greater than the first pressure; and an ejector that selectively augments the first bleed air supply to prepare the buffer supply air for communication to the portion of the gas turbine engine.

In a further embodiment of any of the foregoing embodiments, the ejector is powered by the second bleed air supply.

In a further embodiment of any of the foregoing embodiments, the first bleed air supply is sourced from a location of the gas turbine engine that is upstream from a source of the second bleed air supply.

In a further embodiment of any of the foregoing embodiments, the ejector augments the first bleed air supply to a higher pressure to prepare the buffer supply air in response to detecting at least one condition of the gas turbine engine.

In a further embodiment of any of the foregoing embodiments, the first bleed air supply is augmented by the ejector in response to detecting a low power condition of the gas turbine engine.

In a further embodiment of any of the foregoing embodiments, the first bleed air supply is not augmented by the ejector in response to a high power condition of the gas turbine engine.

A further embodiment of any of the foregoing embodiments includes a controller that selectively commands the ejector to augment the first bleed supply air in response to detecting the at least one condition of the gas turbine engine.

A further embodiment of any of the foregoing embodiments includes a sensor that detects the at least one power condition.

In a further embodiment of any of the foregoing embodiments, the portion is at least one bearing structure.

In a further embodiment of any of the foregoing embodiments, the at least one bearing structure is a first bearing structure configured to support a shaft interconnecting at least a portion of the compressor section and the turbine section. The first bearing structure includes a compartment.

In a further embodiment of any of the foregoing embodiments, the bearing compartment is located upstream from a source of the first bleed air supply and the second bleed air supply.

In a further embodiment of any of the foregoing embodiments, the compressor section includes a first compressor upstream of a second compressor. The first bleed air supply and the second bleed air supply are sourced from the second compressor.

In a further embodiment of any of the foregoing embodiments, the turbine section is configured to drive the fan through a gear arrangement. The at least one bearing structure includes a second bearing structure and a third bearing structure. The second bearing structure is forward of the geared architecture and the third bearing structure is aft of the geared architecture.

In a further embodiment of any of the foregoing embodiments, the fan is configured to deliver a portion of air into the compressor section, and a portion of air into a bypass duct. A bypass ratio, which is defined as a volume of air passing to the bypass duct compared to a volume of air passing into the compressor section, is greater than or equal to about 6.

In a further embodiment of any of the foregoing embodiments, a pressure ratio across the fan is less than about 1.45.

In a further embodiment of any of the foregoing embodiments, a portion of the buffer supply air is communicated to a second portion of the gas turbine engine to device the second portion.

A method of designing a buffer system of a gas turbine engine according to an example of the present disclosure includes the steps of configuring a source to provide a first bleed air supply to an ejector, configuring a second bleed air supply to the ejector, the second bleed air supply having a pressure that is greater than a pressure of the first bleed air supply, and designing the ejector to selectively augment the first bleed air supply with the second bleed air supply to prepare a buffer supply air for communication to a portion of a gas turbine engine.

A further embodiment of any of the foregoing embodiments includes the step of designing the ejector to be powered by the second bleed air supply.

In a further embodiment of any of the foregoing embodiments, the step of designing the ejector includes configuring the ejector to augment the buffer supply air in response to identifying a condition of the gas turbine engine.

A further embodiment of any of the foregoing embodiments includes the step of configuring a controller to identify the condition.

In a further embodiment of any of the foregoing embodiments, the step of designing the ejector includes configuring the ejector to communicate the first bleed supply air with augmentation in response to identifying a first condition of the gas turbine engine, and configuring the ejector to communicate the first bleed supply air without augmentation in response to identifying a second condition of the gas turbine engine.

In a further embodiment of any of the foregoing embodiments, the first condition includes one of a ground condition, a ground idle condition and a descent idle condition.

A further embodiment of any of the foregoing embodiments includes designing the ejector to communicate a portion of the buffer supply air to a second portion of the gas turbine engine to device the second portion.

A further embodiment of any of the foregoing embodiments includes designing the ejector to communicate a portion of the buffer supply air to ventilate the gas turbine engine.

A buffer system for a gas turbine engine according to an example of the present disclosure includes an ejector configured to be secured to a static structure and being in fluid communication with a first bleed air supply and a second bleed air supply. The ejector is configured to selectively augment the first bleed air supply with the second bleed air supply to prepare a buffer supply air for communication to a portion of a gas turbine engine. The first bleed air supply has a first pressure and the second bleed air supply has a second pressure that is greater than the first pressure.

In a further embodiment of any of the foregoing embodiments, the ejector is powered by the second bleed air supply.

In a further embodiment of any of the foregoing embodiments, the ejector is configured to augment the first bleed air supply to a higher pressure to prepare the buffer supply air in response to detecting a condition of the gas turbine engine.

A further embodiment of any of the foregoing embodiments includes a sensor that detects the condition, and a controller that selectively commands the ejector to augment the first bleed supply air in response to the sensor detecting the condition.

In a further embodiment of any of the foregoing embodiments, the first bleed air supply is augmented to a higher pressure by the ejector in response to a first power condition of the gas turbine engine and the first bleed air supply is not augmented by the ejector in response to a second, higher power condition of the gas turbine engine.

In a further embodiment of any of the foregoing embodiments, the portion is at least one bearing structure configured to be secured to the static structure.

The various features and advantages of this disclosure will become apparent to those skilled in the art from the following detailed description. The drawings that accompany the detailed description can be briefly described as follows.

DETAILED DESCRIPTION

Figure 1:
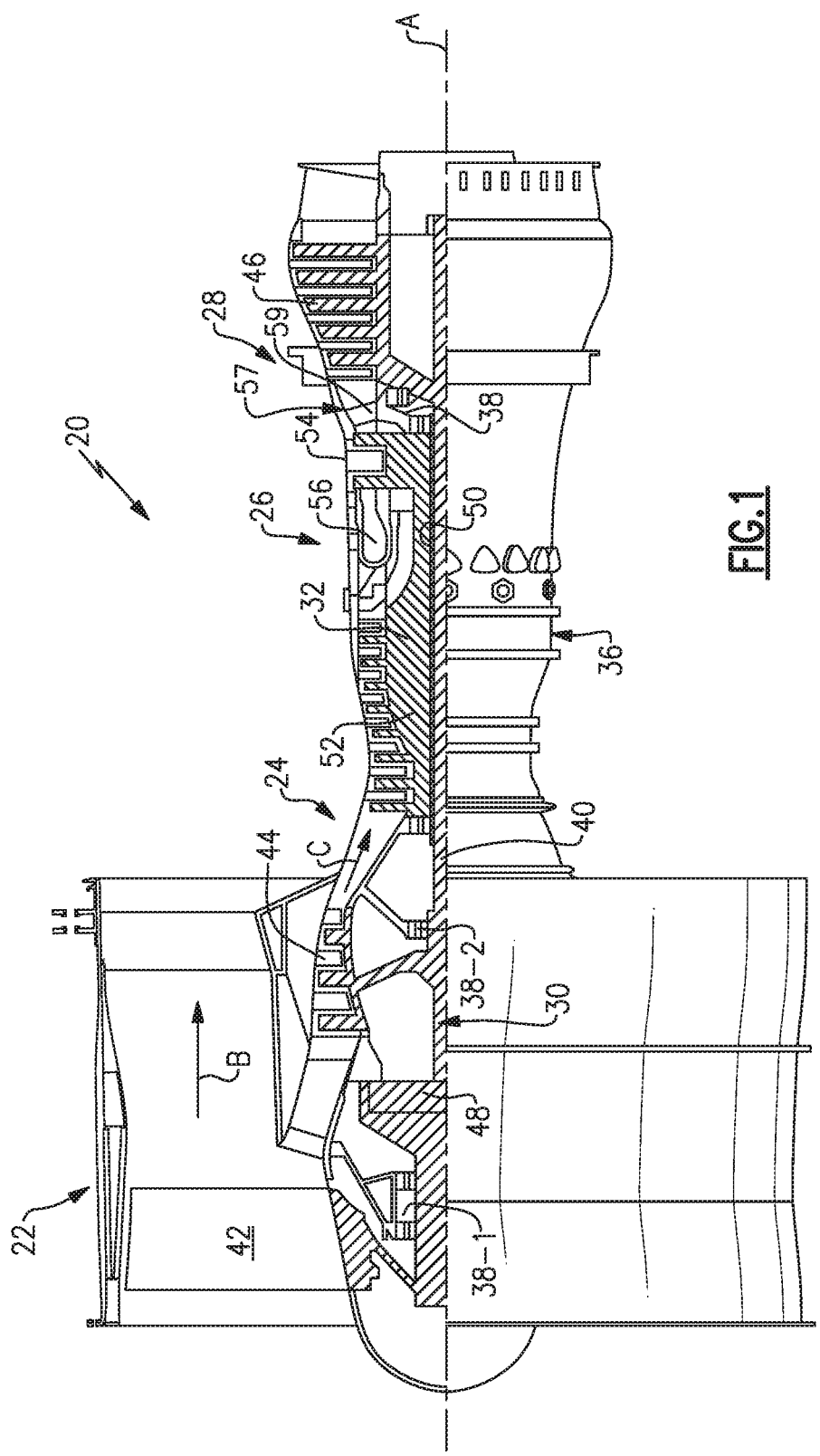
FIG. 1 schematically illustrates a cross-sectional view of a gas turbine engine.

FIG. 1 schematically illustrates a gas turbine engine 20. The gas turbine engine 20 disclosed herein is a two spool turbofan engine that generally incorporates a fan section 22, a compressor section 24, a combustor section 26 and a turbine section 28. Alternative engines might include an augmenter section (not shown) among other systems or features. The fan section 22 drives air along a bypass flow path B while the compressor section 24 drives air along a core flow path C for compression and communication into the combustor section 26. The hot combustion gases generated in the combustor section 26 are expanded through the turbine section 28. Although depicted as a turbofan gas turbine engine in the disclosed non-limiting embodiment, it should be understood that the concepts described herein are not limited to turbofan engines and these teachings could extend to other types of turbine engines, including but not limited to three spool engine architectures.

The gas turbine engine 20 generally includes a low speed spool 30 and a high speed spool 32 mounted for rotation about an engine centerline longitudinal axis A relative to an engine static structure 36 via several bearing structures 38. It should be understood that various bearing structures 38 at various locations may alternatively or additionally be provided.

The low speed spool 30 generally includes an inner shaft 40 that interconnects a fan 42, a low pressure compressor 44 and a low pressure turbine 46. The inner shaft 40 can be connected to the fan 42 through a geared architecture 48 to drive the fan 42 at a lower speed than the low speed spool 30. The high speed spool 32 includes an outer shaft 50 that interconnects a high pressure compressor 52 and a high pressure turbine 54. In this example, the inner shaft 40 and the outer shaft 50 are supported at a plurality of points by bearing structures 38 positioned within the engine static structure 36. In one non-limiting embodiment, bearing structures 38 include at least a #1 bearing structure 38-1 forward of the geared architecture 48 and a #2 bearing structure 38-2 located aft of the geared architecture 48.

A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 can support one or more bearing structures 38 in the turbine section 28. The inner shaft 40 and the outer shaft 50 are concentric and rotate via the bearing structures 38 about the engine centerline longitudinal axis A which is collinear with their longitudinal axes. The inner shaft 40 and the outer shaft 50 can be either co-rotating or counter-rotating with respect to one another.

The core airflow C is compressed by the low pressure compressor 44 and the high pressure compressor 52, is mixed with fuel and burned in the combustor 56, and is then expanded over the high pressure turbine 54 and the low pressure turbine 46. The mid-turbine frame 57 includes airfoils 59 which are in the core airflow path. The high pressure turbine 54 and the low pressure turbine 46 rotationally drive the respective high speed spool 32 and the low speed spool 30 in response to the expansion.

In some non-limiting examples, the gas turbine engine 20 is a high-bypass geared aircraft engine. In a further example, the gas turbine engine 20 bypass ratio is greater than about six (6:1). The geared architecture 48 of the example gas turbine engine 20 includes an epicyclic gear train, such as a planetary gear system or other gear system. The example epicyclic gear train has a gear reduction ratio of greater than about 2.3. The geared architecture 48 enables operation of the low speed spool 30 at higher speeds which can increase the operational efficiency of the low pressure compressor 44 and low pressure turbine 46 and render increased pressure in a fewer number of stages.

The low pressure turbine 46 pressure ratio is pressure measured prior to inlet of low pressure turbine 46 as related to the pressure at the outlet of the low pressure turbine 46 prior to an exhaust nozzle of the gas turbine engine 20. In one non-limiting embodiment, the bypass ratio of the gas turbine engine 20 is greater than about ten (10:1), the fan diameter is significantly larger than that of the low pressure compressor 44, and the low pressure turbine 46 has a pressure ratio that is greater than about 5 (5:1). The geared architecture 48 of this embodiment is an epicyclic gear train with a gear reduction ratio of greater than about 2.5:1. It should be understood, however, that the above parameters are only exemplary of one embodiment of a geared architecture engine and that the present disclosure is applicable to other gas turbine engines including direct drive turbofans.

In this embodiment of the example gas turbine engine 20, a significant amount of thrust is provided by a bypass flow B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45.

Low Corrected Fan Tip Speed is the actual fan tip speed divided by an industry standard temperature correction of "T"/$518.7^{0.5}$. T represents the ambient temperature in degrees Rankine. The Low Corrected Fan Tip Speed according to one non-limiting embodiment of the example gas turbine engine 20 is less than about 1150 fps (351 m/s).

Figure 2:
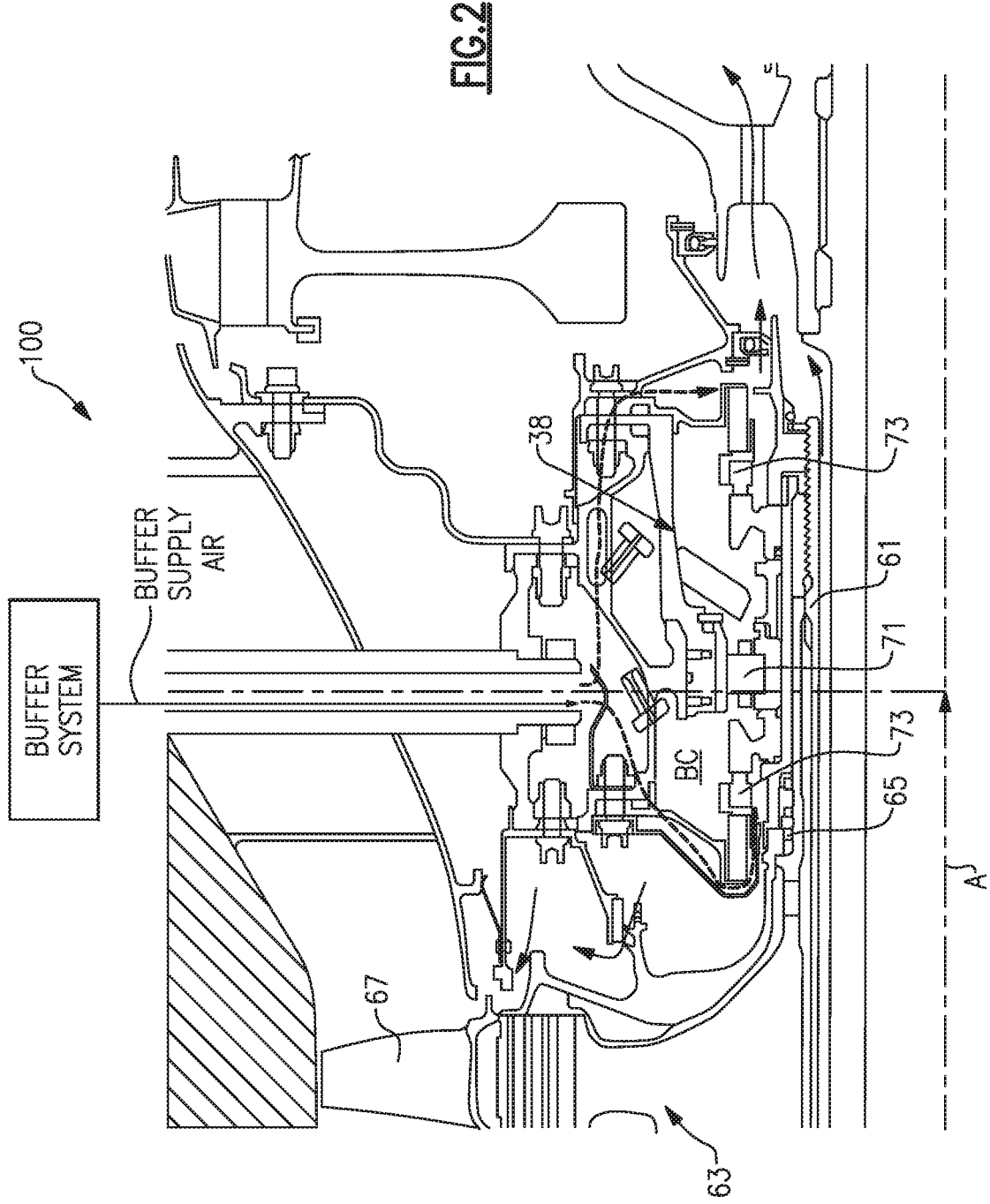
FIG. 2 illustrates a schematic cross-section of a portion of the gas turbine engine.

FIG. 2 illustrates a portion 100 of a gas turbine engine, such as the gas turbine engine 20. The portion 100 can include one or more bearing structures 38. Only one bearing structure 38 is depicted in FIG. 2 to schematically illustrate its features, but this is in no way intended to limit this disclosure.

The bearing structure 38 supports a shaft 61, such as the inner shaft 40 or the outer shaft 50, which supports a rotor assembly 63, such as a rotor assembly of the compressor section 24 or the turbine section 28, through a hub 65. The rotor assembly 63 carries at least one airfoil 67 for adding or extracting energy from the core airflow.

The bearing structure 38 defines a bearing compartment BC that houses one or more bearings 71. The bearing compartment BC contains a lubricant for lubricating (and acting as a cooling medium to) the bearings 71. One or more seals 73 (two shown) contain the lubricant within the bearing compartment BC. The seals 73 of the bearing compartment BC must be pressurized to prevent the lubricant from leaking out during certain ground and flight conditions (both steady state and transient). A buffer system can be used to communicate buffer supply air to the bearing compartment BC in order to provide adequate pressurization of the seals 73 without exceeding material and/or lubricant temperature limitations. Example buffer systems that can be used for this and other purposes are detailed below.

Figure 3:
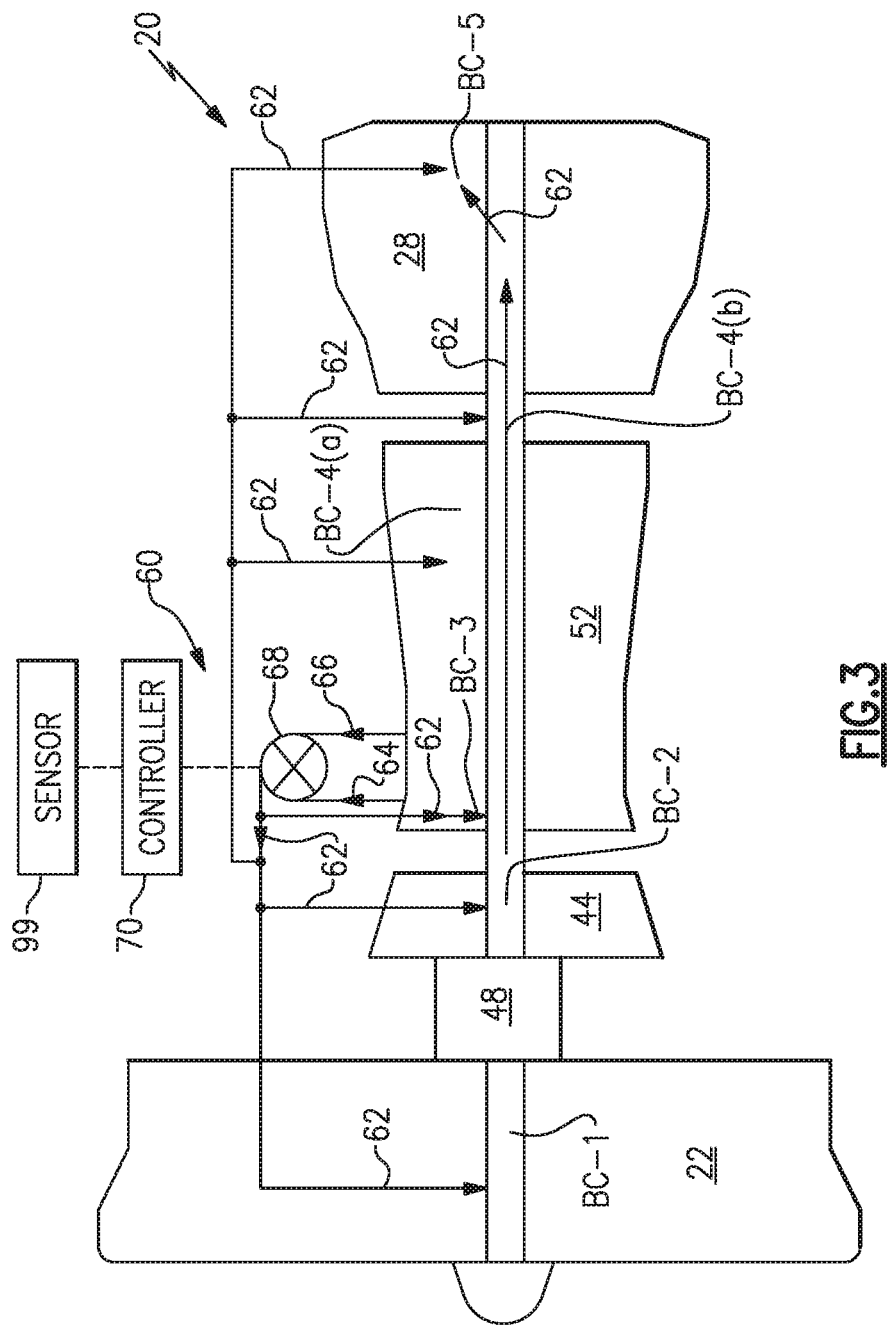
FIG. 3 illustrates an example buffer system that can be incorporated into a gas turbine engine.

FIG. 3 illustrates an example buffer system 60 that can communicate buffer supply air 62 to a portion of the gas turbine engine 20, such as to one or more bearing compartments BC. In this example, bearing compartments BC-1, BC-2, BC-3, BC-4(a), BC-4(b) and BC-5 can be fed with buffer supply air 62. The buffer supply air 62 pressurizes the bearing compartments BC and can maintain the bearing compartments BC at an acceptable temperature. Although the example embodiment illustrates communication of the buffer supply air 62 to multiple bearing compartments BC-1 through BC-5 to provide adequate bearing compartment seal pressurization to prevent lubricant leakage, buffer supply air 62 could be communicated to only a single bearing compartment or could be communicated for anti-icing, ventilation, cooling and other purposes.

The buffer system 60 includes a first bleed air supply 64 and a second bleed air supply 66. In other words, the buffer system 60 is a dual supply system. In the exemplary embodiment, the first bleed air supply 64 is a low pressure bleed air supply and the second bleed air supply 66 is a high pressure bleed air supply that includes a pressure that is greater than the pressure of the first bleed air supply 64.

The first bleed air supply 64 can be sourced from the fan section 22, the low pressure compressor 44 or the high pressure compressor 52. In the illustrated non-limiting example, the first bleed air supply 64 is sourced from an upstream stage of the high pressure compressor 52. However, the first bleed air supply 64 could be sourced from any location that is upstream from the second bleed air supply 66. The second bleed air supply 66 can be sourced from the high pressure compressor 52, such as from a middle or downstream stage of the high pressure compressor 52. The second bleed air supply 66 could also be sourced from the low pressure compressor 44 or the fan section 22 depending on from where the first bleed air supply 64 is sourced.

The buffer system 60 can also include a valve 68 that is in communication with both the first bleed air supply 64 and the second bleed air supply 66. Although shown schematically, the first bleed air supply 64 and the second bleed air supply 66 can be in fluid communication with the valve 68 via buffer tubing, conduits, or other passageways. Check valves may also be used to prevent the second bleed air supply 66 from backflowing into the first bleed air supply 64.

The valve 68 can select between the first bleed air supply 64 and the second bleed air supply 66 to communicate the buffer supply air 62 to a desired portion(s) of the gas turbine engine 20. In other words, the buffer supply air 62 that is communicated is either the first bleed air supply 64 or the second bleed air supply 66 depending on which air supply is ultimately selected by the valve 68, as is further discussed below.

The determination of whether to communicate the first bleed air supply 64 or the second bleed air supply 66 as the buffer supply air 62 is based on a power condition of the gas turbine engine 20. The term "power condition" as used in this disclosure generally refers to an operability condition of the gas turbine engine 20. Gas turbine engine power conditions can include low power conditions and high power conditions. Example low power conditions include, but are not limited to, ground operation, ground idle, and descent idle. Example high power conditions include, but are not limited to, takeoff, climb, and cruise conditions. It should be understood that other power conditions are also contemplated as within the scope of this disclosure.

In one exemplary embodiment, the valve 68 communicates the first bleed air supply 64 (which is a relatively lower pressure bleed air supply) as the buffer supply air 62 in response to identifying a high power condition of a gas turbine engine 20. The second bleed air supply 66 (which is a relatively higher pressure bleed air supply) is selected by the valve 68 and communicated as the buffer supply air 62 in response to detecting a low power condition of the gas turbine engine 20. Both the first bleed air supply 64 and the second bleed air supply 66 are intended to maintain the same minimum pressure delta across the bearing compartment seals. Low power conditions require a higher stage pressure source to contain the lubricant within the bearing compartment, while high power conditions require a lower stage pressure source. The buffer system 60 can use the lowest possible compressor stage to meet pressure requirements in order to minimize supply temperature and any performance impact to the gas turbine engine 20.

The valve 68 can be a passive valve. A passive valve operates like a pressure regulator that can switch between two or more sources without being commanded to do so by a controller, such as an engine control (EEC). The valve 68 of this example uses only a single input which is directly measured to switch between the first bleed air supply 64 and the second bleed air supply 66.

The valve 68 could also be a controller based valve. For example, the buffer system 60 can include a controller 70 in communication with the valve 68 for selecting between the first bleed air supply 64 and the second bleed air supply 66. The controller 70 is programmed with the necessary logic for selecting between the first bleed air supply 64 and the second bleed air supply 66 in response to detecting a pre-defined power condition of the gas turbine engine 20. The controller 70 could also be programmed with multiple inputs.

In one example, a sensor 99 detects a power condition of the gas turbine engine 20 and communicates a signal to the controller 70 to command modulation of the valve 68 between the first bleed air supply 64 and the second bleed air supply 66. The valve 68 could also be modulated to an intermediate level to inter-mix the first bleed air supply 64 and the second bleed air supply 66. Of course, this view is highly schematic. It should be understood that the sensor 99 and the controller 70 can be programmed to detect any power condition. Also, the sensor 99 can be replaced by any control associated with the gas turbine engine 20 or an associated aircraft. Also, although shown as a separate feature, the controller functionality could be incorporated into the valve 68.

Figure 4:
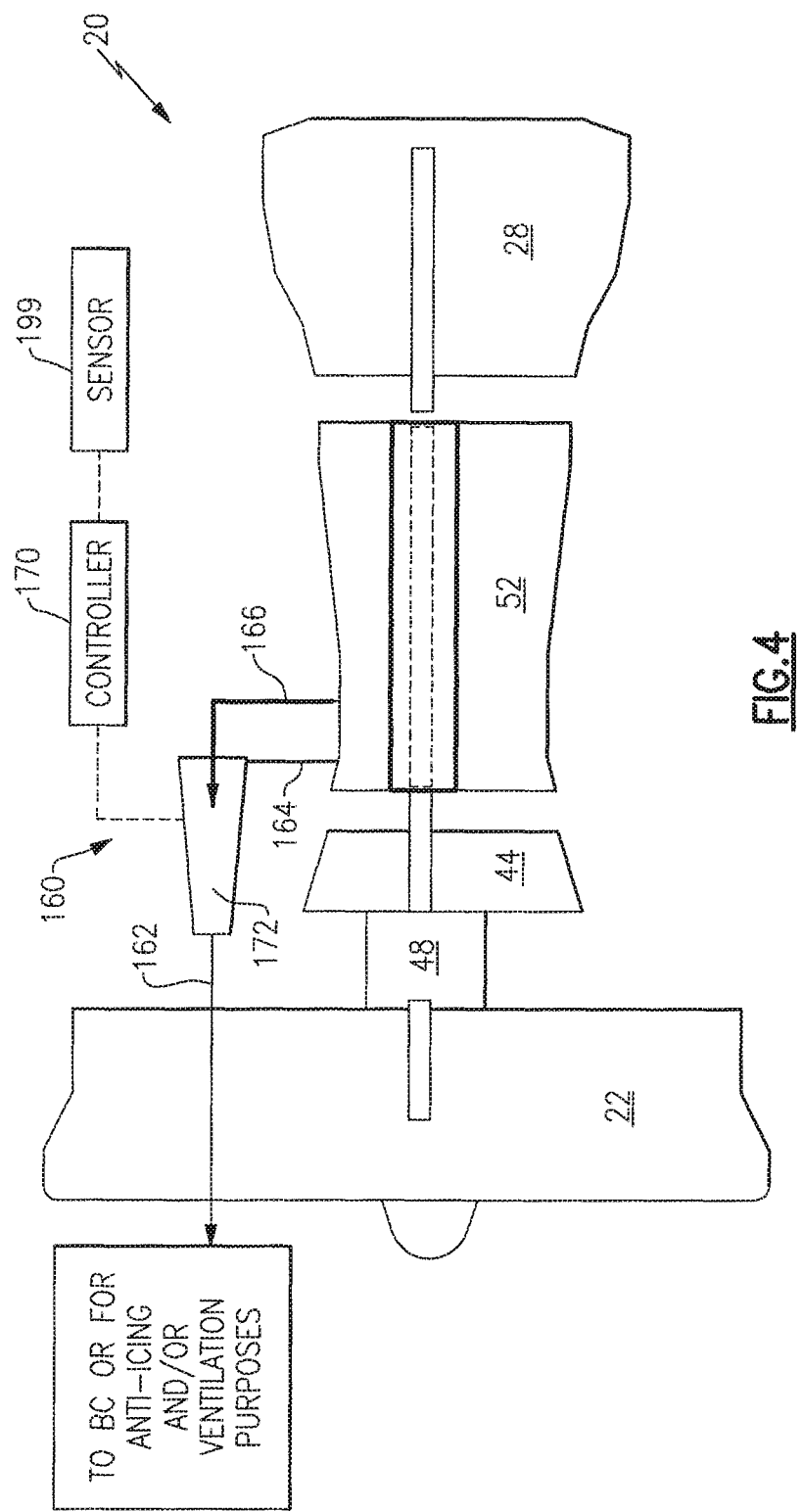
FIG. 4 illustrates another example buffer system that can be incorporated into a gas turbine engine.

FIG. 4 illustrates another example buffer system 160 that can communicate buffer supply air 162 to provide adequate bearing compartment seal pressurization at an acceptable temperature. The buffer supply air 162 can also be used for additional purposes such as anti-icing and ventilation or for other cooling requirements of the gas turbine engine 20.

The buffer system 160 includes a first bleed air supply 164, a second bleed air supply 166 and an ejector 172. If necessary, the first bleed air supply 164 can be augmented by the ejector 172 to prepare the buffer supply air 162 for communication to a portion of the gas turbine engine 20, such as a bearing compartment BC (schematically shown by FIG. 4). In other words, the ejector 172 can add pressure (using a relatively small amount of the second bleed air supply 166) to the first bleed air supply 164 to prepare the buffer supply air 162 for communication to an appropriate location of a gas turbine engine 20. In one exemplary embodiment, the ejector 172 can mix the first bleed air supply 164 of a first pressure with the second bleed air supply 166 of a second higher pressure to render the buffer supply air 162 of an intermediate pressure to the first bleed air supply 164 and the second bleed air supply 166.

The second bleed air supply 166, which is a higher pressure air than the first bleed air supply 164, can be communicated to the ejector 172 to power the ejector 172. The first bleed air supply 164 can be sourced from the fan section 22, the low pressure compressor 44 or the high pressure compressor 52. The second bleed air supply 166 can be sourced from a middle or downstream stage of the high pressure compressor 52, or can include diffuser air. The second bleed air supply 166 could also be sourced from the low pressure compressor 44 or the fan section 22 depending on from where the first bleed air supply 164 is sourced.

Augmentation of the first bleed air supply 164 prepares the buffer supply air 162 at an adequate pressure and temperature to pressurize the bearing compartment(s) BC. The determination of whether or not to augment the first bleed air supply 164 with the ejector 172 is based on a power condition of the gas turbine engine 20. Gas turbine engine power conditions can include low power conditions and high power conditions. Example low power conditions include, but are not limited to, ground operation, ground idle and descent idle. Example high power conditions include, but are not limited to, takeoff, climb, and cruise conditions. It should be understood that other power conditions are also contemplated as within the scope of this disclosure.

In one example, the first bleed air supply 164 is augmented by the ejector 172 in response to detecting a low power condition of the gas turbine engine 20 in order to communicate a buffer supply air 162 having adequate pressurization. The amount of augmentation performed on the first bleed air supply 164 can vary depending upon the type of power condition that is detected and the pressure requirements of the bearing compartment(s) BC. For example, in one embodiment, the first bleed air supply 164 is not augmented by the ejector 172 in response to detection of a high power condition of the gas turbine engine 20. In other words, the first bleed air supply 164 can be communicated as the buffer supply air 162 without any augmentation in response to some power conditions.

The buffer system 160 can include a controller 170 in communication with the ejector 172 for determining whether or not to augment the first bleed air supply 164. The controller 170 is programmed with the necessary logic for making this determination in response to detecting a pre-defined power condition of the gas turbine engine 20. In one example, a sensor 199 detects a power condition of the gas turbine engine 20 and communicates a signal to the controller 170 to command the ejector 172 to augment the first bleed air supply 64. Of course, this view is highly schematic. It should be understood that the sensor 199 and the controller 170 can be programmed to detect any power condition. Also, the sensor 199 can be replaced by any control associated with the gas turbine engine 20 or an associated aircraft. Also, although shown as a separate feature, the controller 170 functionality could be incorporated into the ejector 172.

Figure 5:
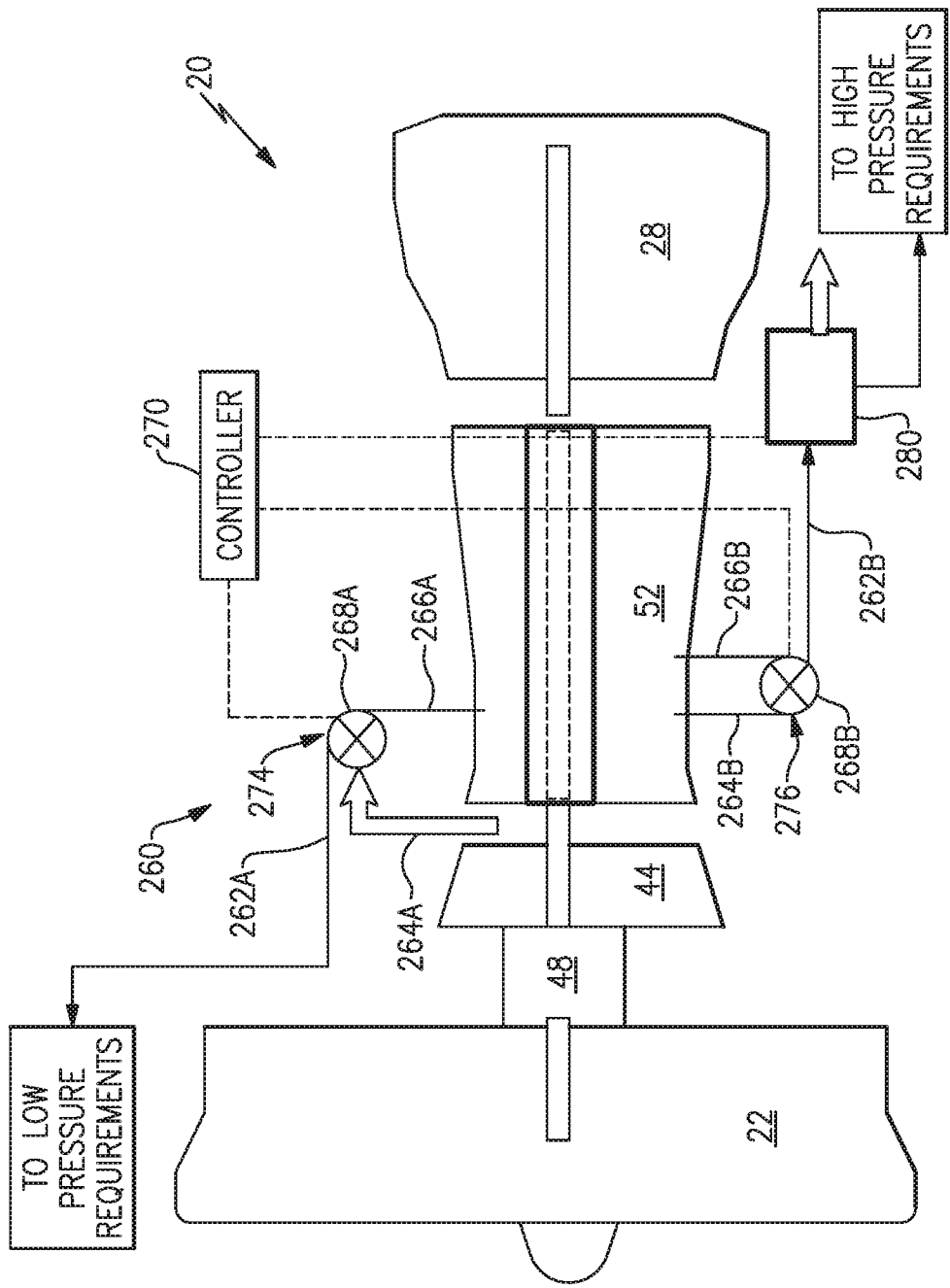
FIG. 5 illustrates yet another example buffer system that can be incorporated into a gas turbine engine.

FIG. 5 illustrates yet another example buffer system 260. In this example, the buffer system 260 is a two-circuit, multi-source buffer system that includes at least a first circuit 274 and a second circuit 276. Additional circuits could also be incorporated. Low pressure requirements of the gas turbine engine 20 can be fed with a first buffer supply air 262A from the first circuit 274, while high pressure requirements of the gas turbine engine 20 can be buffered with a second buffer supply air 262B from the second circuit 276. In other words, the first circuit 274 can buffer a first portion(s) of the gas turbine engine 20, while the second circuit 276 can buffer a second, different portion(s). Example components subject to low pressure requirements include bearing compartments in low pressure regions of the gas turbine engine 20, such as front or rear bearing compartments. Example components subject to high pressure requirements include bearing compartments in high pressure regions of the gas turbine engine 20, such as mid-engine bearing compartments.

In this example, the first circuit 274 is similar to the buffer system 60 of FIG. 3 and includes a first bleed air supply 264A, a second bleed air supply 266A and a valve 268A. The second circuit 276 includes a first bleed air supply 264B, a second bleed air supply 266B, a valve 268B and a conditioning device 280. In this non-limiting example, the conditioning device 280 cools the second buffer supply air 262B to an acceptable temperature for addressing higher pressure requirements. The conditioning device could include an air-to-air heat exchanger, a fuel-to-air heat exchanger, or any other suitable heater exchanger. The conditioning device 280 could also be a device other than a heat exchanger.

The second bleed air supply 266A of the first circuit 274 can be common to the first bleed air supply 264B of the second circuit 276. These sources can also be completely separate. In each of the first circuit 274 and the second circuit 276, the second bleed air supplies 266A, 266B are communicated as the buffer supply airs 262A, 262B for low power conditions of the gas turbine engine 20 and the first bleed air supplies 264A, 264B are communicated as the buffer supply airs 262A, 262B in response to high power conditions of the gas turbine engine 20. Example low power conditions include, but are not limited to, ground operation, ground idle and flight idle conditions. Example high power conditions include, but are not limited to, takeoff, climb, and cruise conditions. It should be understood that other power conditions are also contemplated as within the scope of this disclosure.

In one exemplary embodiment, the valves 268A, 268B select and communicate the first bleed air supplies 264A, 264B (which are relatively lower pressure bleed air supplies) as the buffer supply airs 262A, 262B in response to identifying a high power condition of a gas turbine engine 20. The second bleed air supplies 266A, 266B (which are relatively higher pressure bleed air supplies) are selected by the valves 268A, 268B and communicated as the buffer supply airs 262A, 262B in response to detecting a low power condition of the gas turbine engine 20. Both the lower bleed air supplies and the higher bleed air supplies are intended to maintain the same minimum pressure delta across the bearing compartment seals. Low power conditions require a higher stage pressurize source to contain the lubricant within the bearing compartment, while high power conditions require a lower pressure stage source. The buffer system 260 can use the lowest possible compressor stage to meet the pressure requirements in order to minimize supply temperature and any performance impact to the gas turbine engine 20.

The buffer system 260 can also include a controller 270 in communication with the valves 268A, 268B for selectively switching between the first bleed air supplies 264A, 264B and the second bleed air supplies 266A, 266B. A single controller or multiple controllers could be utilized. The controller 270 can also command operation of the conditioning device 280 of the second circuit 276 for cooling the buffer supply air 262B. Alternatively, separate controllers can be used to control each of the first circuit 274, the second circuit 276 and the conditioning device 280.

Although the different examples have a specific component shown in the illustrations, embodiments of this disclosure are not limited to those particular combinations. It is possible to use some of the components or features from one of the examples in combination with features or components from another one of the examples.

Furthermore, the foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A gas turbine engine, comprising:
a fan section including a fan and a first bearing structure, wherein said first bearing structure defines a bearing compartment that houses one or more bearings;
a geared architecture that drives said fan, wherein said first bearing structure is forward of said geared architecture with respect to an engine longitudinal axis;
a turbine section includes a fan drive turbine that drives said geared architecture and includes a second turbine;
a compressor section downstream of said fan, said compressor section including a low pressure compressor driven by said turbine section and a high pressure compressor driven by said second turbine; and
a buffer system that communicates a buffer supply air to a portion of the gas turbine engine, wherein said portion includes at least one bearing compartment of the gas turbine engine, and said at least one bearing compartment comprises said bearing compartment of said first bearing structure, and wherein said buffer system includes:
a first bleed air supply having a first pressure;
a second bleed air supply having a second pressure that is greater than said first pressure;
an ejector that selectively augments said first bleed air supply to prepare said buffer supply air for communication to said portion of the gas turbine engine;
a controller that selectively commands said ejector to augment said first bleed supply air in response to detecting a power condition of the gas turbine engine;
a sensor that detects said power condition; and
wherein said first bleed air supply is augmented to a higher pressure by said ejector in response to a low power condition of the gas turbine engine, but said first bleed air supply is not augmented by said ejector in response to a high power condition of the gas turbine engine.

2. The gas turbine engine as recited in claim 1, wherein said ejector is powered by said second bleed air supply.

3. The gas turbine engine as recited in claim 1, wherein said first bleed air supply is sourced from a location of the gas turbine engine that is upstream from a source of said second bleed air supply.

4. The gas turbine engine as recited in claim 1, wherein said first bleed air supply and said second bleed air supply are each sourced from said high pressure compressor.

5. The gas turbine engine as recited in claim 1, wherein said at least one bearing compartment is located upstream from a source of said first bleed air supply and said second bleed air supply.

6. The gas turbine engine as recited in claim 1, wherein said first bleed air supply is sourced from said low pressure compressor and said second bleed air supply is sourced from a middle stage or a downstream stage of said high pressure compressor.

7. The gas turbine engine as recited in claim 1, wherein said first bleed air supply is sourced from said fan section of the gas turbine engine and said second bleed air supply is sourced from said low pressure compressor.

8. The gas turbine engine as recited in claim 1, wherein said first bleed air supply is augmented to a higher pressure by said ejector in response to sensing a ground operation, a ground idle or a descent idle condition of the gas turbine engine.

9. The gas turbine engine as recited in claim 1, wherein said first bleed air supply is sourced from said fan section or said low pressure compressor and said second bleed air supply is sourced from said low pressure compressor or said high pressure compressor.

10. The gas turbine engine as recited in claim 9, further comprising a second bearing structure located aft of said geared architecture with respect to said engine longitudinal axis.

11. The gas turbine engine as recited in claim 10, wherein said at least one bearing compartment comprises a bearing compartment of said second bearing structure.

12. The gas turbine engine as recited in claim 1, wherein a portion of the buffer supply air is utilized to ventilate the gas turbine engine.

13. A gas turbine engine, comprising:
a fan section including a fan and a first bearing structure defining a first bearing compartment;
a geared architecture that drives said fan, wherein said geared architecture includes an epicyclic gear train, and said first bearing structure is forward of said geared architecture with respect to an engine longitudinal axis;
a compressor section;
a combustor in fluid communication with said compressor section;
a turbine section in fluid communication with said combustor, said turbine section including a fan drive turbine that drives said fan and including a second turbine;
at least one shaft that interconnects at least a portion of said compressor section and said turbine section;
a second bearing structure that supports said at least one shaft, wherein said second bearing structure includes a second bearing compartment;
a buffer system that selectively communicates a buffer supply air to pressurize said first bearing compartment of said first bearing structure and said second bearing compartment of said second bearing structure, wherein said buffer system includes a first bleed air supply and an ejector that is selectively powered by a second bleed air supply of a greater pressure than said first bleed air supply;
a controller that selectively commands said ejector to augment said first bleed supply air in response to detecting a power condition of the gas turbine engine; and
a sensor that detects said power condition,
wherein said first bleed air supply is augmented to a higher pressure by said ejector in response to a low power condition of the gas turbine engine, but said first bleed air supply is not augmented by said ejector in response to a high power condition of the gas turbine engine.

14. The gas turbine engine as recited in claim 13, wherein the gas turbine engine includes a low fan pressure ratio of less than 1.45.

15. The gas turbine engine as recited in claim 13, wherein said first bleed air supply is sourced from a location of the gas turbine engine that is upstream from a source of said second bleed air supply.

16. A method of cooling a portion of a gas turbine engine, comprising:
communicating a first bleed air supply and a second bleed air supply to an ejector;
identifying a power condition of the gas turbine engine with a sensor;
augmenting the first bleed supply air with the second bleed air supply within the ejector to prepare a buffer supply air for communication to the portion in response to identifying a low power condition of the gas turbine engine;
communicating the first bleed supply air without augmentation in response to identifying a high power condition of the gas turbine engine;
wherein the augmenting is selectively commanded by a controller; and
wherein the portion includes a bearing compartment defined by a bearing structure located in a fan section, and said bearing structure is forward of a geared architecture with respect to an engine longitudinal axis of the gas turbine engine, and said fan section includes a fan driven by a fan drive turbine via the geared architecture.

17. The method as recited in claim 16, wherein the low power condition includes one of a ground condition, a ground idle condition and a descent idle condition.

18. The method as recited in claim 17, comprising the step of:
using a portion of the buffer supply air to ventilate the gas turbine engine.

19. The method as recited in claim 17, comprising the steps of:
sensing one of the low power condition and the high power condition of the gas turbine engine;
communicating a signal representative of either the low power condition or the high power condition to the controller; and
commanding performance of the augmenting in response to sensing the low power condition.

20. The method as recited in claim 19, comprising the step of:
using a portion of the buffer supply air to ventilate the gas turbine engine.

* * * * *